Aug. 10, 1943.  T. L. FAWICK  2,326,451

FLEXIBLE COUPLING

Original Filed April 25, 1941

INVENTOR.
Thomas L. Fawick
BY
Willard D. Eakin

Patented Aug. 10, 1943

2,326,451

UNITED STATES PATENT OFFICE 2,326,451

FLEXIBLE COUPLING

Thomas L. Fawick, Akron, Ohio

Original application April 25, 1941, Serial No. 390,277. Divided and this application August 9, 1941, Serial No. 406,126

4 Claims. (Cl. 64—11)

The invention of the present application, which is a division of my application Ser. No. 390,277, filed April 25, 1941, relates to flexible couplings and its chief objects are simplicity and economy of construction; convenient provision for cushioning of the torque and for varying the modulus of torque-cushioning, as for adapting the coupling for different torque loads or for avoiding harmonic vibration; to provide a coupling adapted to operate at high speed without harmful effects resulting from centrifugal force; and to provide some or all of these advantages in a coupling adapted to sustain and cushion axial thrust, as in marine service, for example.

Figure 2:
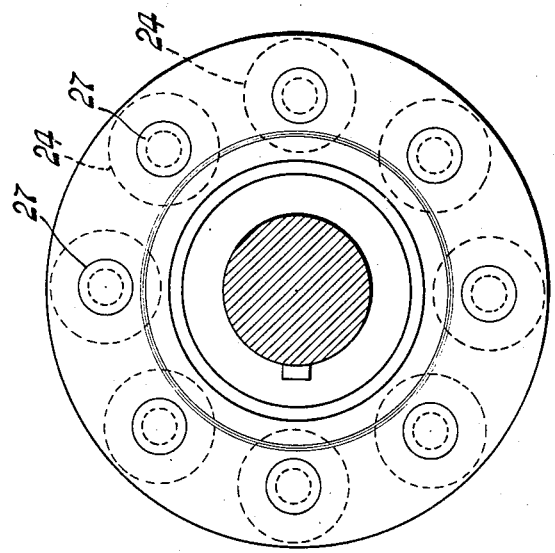
Fig. 2 is an elevation of the same as viewed from the right of Fig. 1.
Figure 1:
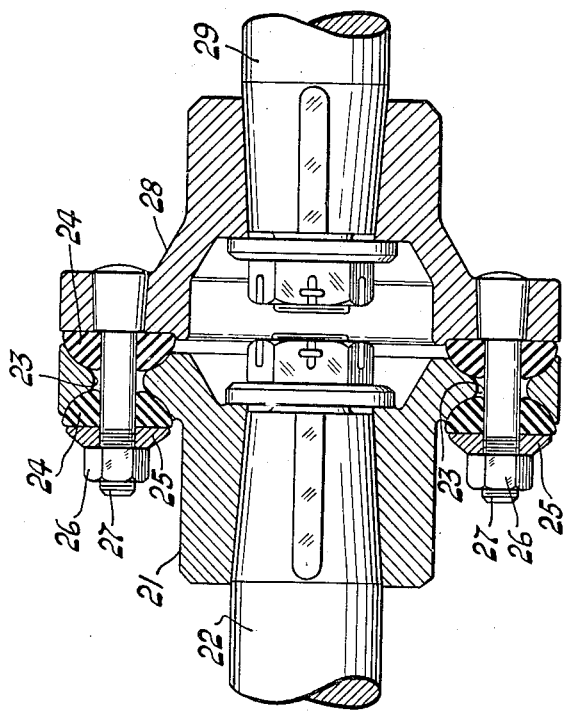
Fig. 1 is an axial section of a coupling assembly embodying my invention in its preferred form as adapted for sustaining thrust.

Referring to the drawing, the coupling comprises a pair of coupling members 21 and 28 mounted respectively upon shafts 22 and 29, either of which may be the driving shaft and the other the driven shaft.

The member 21 is formed with a circumferential series of waisted holes 23, 23 for receiving respective pairs of approximately hemispherical blocks of rubber 24, 24, the blocks of each pair being drawn toward each other, into the tapered portions of the holes 23, by a washer 25 and nut 26 mounted on a bolt 27 which projects through the rubber blocks from the member 28 mounted upon the other shaft 29.

The setting up of the nuts puts the rubber blocks under both axial and radial compression, so that in a sense they are preloaded as to both torque transmission and the sustension of thrust.

The spherical tapers are preferred because they avoid excessively localized strain of the rubber as to all forces involved, including those incident to shaft misalignment.

The torque-cushioning and thrust-sustaining characteristics of the rubber blocks can easily be varied, to adapt the coupling for different torque loads or for avoiding harmonic or sympathetic vibration in the coupling, as the nuts 26 are readily accessible after installation, for changing the modulus of the rubber blocks, and some or all of the advantages set out in the above statements of objects are provided, including especially the cushioned sustention of thrust.

I claim:

1. A flexible coupling assembly comprising a pair of transmission shafts in series and, for connecting the same, rigid coupling members mounted upon them respectively and axially facing each other, one of said coupling members being formed with a circumferential series of holes extending axially through it, torque-transmitting cushion members mounted in and individual to said holes and formed with axially disposed holes, and a set of studs rigidly projecting axially from the other of said coupling members and occupying the holes in said cushion members, the cushion members, individual with relation to the holes, insulating the studs from the coupling member in which they are mounted and sustaining the entire torque and being interlocked with the latter in an axial direction for cushioned sustention of thrust, by reason of their being of different outer diameters in different parts of their lengths, so that the interlock is at a distance from their ends, and being fitted against complemental seats in the member in which they are mounted, the cushion members being held under radial compression between said seats and the studs.

2. A flexible coupling assembly comprising a pair of transmission shafts in series and, for connecting the same, rigid coupling members mounted upon them respectively and axially facing each other, one of said coupling members being formed with a circumferential series of holes extending axially through it, torque-transmitting cushion members mounted in and individual to said holes and formed with axially disposed holes, a set of studs rigidly projecting axially from the other of said coupling members and occupying the holes in said cushion members, and means on said studs for clamping the cushion members in an axial direction, the cushion members, individual with relation to the holes, insulating the studs from the coupling member in which they are mounted and sustaining the entire torque and being interlocked with the latter in an axial direction for cushioned sustention of thrust, by reason of their being of different outer diameters in different parts of their lengths, so that the interlock is at a distance from their ends, and being fitted against complemental seats in the member in which they are mounted, the cushion members being held under radial compression between said seats and the studs.

3. A flexible coupling assembly comprising a pair of transmission shafts in series and, for connecting the same, rigid coupling members mounted upon them respectively and axially facing each other, one of said coupling members being formed with a circumferential series of holes of waisted form, for axial interlock, extending axially through it, torque-transmitting cushion members fitting in said holes and formed with axially disposed holes, a set of studs rigidly projecting from the other of said coupling members and occupying the holes in said cushion members, and means on the studs for clamping the cushion members, the cushion members insulating the studs and clamping means from the member in which the cushion members are mounted.

4. A flexible coupling assembly comprising a pair of transmission shafts in series and, for connecting the same, rigid coupling members mounted upon them respectively and axially facing each other, one of said coupling members being formed with a circumferential series of holes of waisted form, for axial interlock, extending axially through it, torque-transmitting cushion members fitting in said holes and formed with axially disposed holes, a set of studs rigidly projecting from the other of said coupling members and occupying the holes in said cushion members, and means on the studs for clamping the cushion members, the cushion members insulating the studs and clamping means from the member in which the cushion members are mounted, and each of said holes of waisted form having substantially hemispherical portions providing seats for the cushion members.

THOMAS L. FAWICK.